(12) United States Patent
Hausman

(10) Patent No.: US 12,525,067 B2
(45) Date of Patent: *Jan. 13, 2026

(54) SYSTEM AND METHOD FOR TOLL TRANSACTIONS UTILIZING A DISTRIBUTED LEDGER

(71) Applicant: Hausman Properties, LLC, Houston, TX (US)

(72) Inventor: Brian Hausman, Houston, TX (US)

(73) Assignee: Hausman Properties, LLC, Houston, TX (US)

( * ) Notice: Subject to any disclaimer, the term of this patent is extended or adjusted under 35 U.S.C. 154(b) by 551 days.

This patent is subject to a terminal disclaimer.

(21) Appl. No.: 17/666,512

(22) Filed: Feb. 7, 2022

(65) Prior Publication Data

US 2022/0165098 A1 May 26, 2022

Related U.S. Application Data

(63) Continuation of application No. 16/914,430, filed on Jun. 28, 2020, now Pat. No. 11,250,646, which is a
(Continued)

(51) Int. Cl.
*G07B 15/06* (2011.01)
*H04L 9/06* (2006.01)
(Continued)

(52) U.S. Cl.
CPC .......... *G07B 15/063* (2013.01); *H04L 9/0637* (2013.01); *H04L 9/0643* (2013.01);
(Continued)

(58) Field of Classification Search
CPC ...... G07B 15/02; G07B 15/04; G07B 15/063; G07B 15/06; G07B 15/00; G06Q 2240/00;
(Continued)

(56) References Cited

U.S. PATENT DOCUMENTS 6,725,202 B1 4/2004 Hurta et al.
8,473,332 B2 6/2013 Robinson et al.
(Continued)

FOREIGN PATENT DOCUMENTS

EP 0998073 5/2000
EP 3236374 10/2017
WO 2017007806 1/2017

OTHER PUBLICATIONS

D. Jadhav and M. Sabnis, "Open road tolling in India by pattern recognition," 2015 International Conference on Technologies for Sustainable Development (ICTSD), Mumbai, India, 2015, pp. 1-5, doi: 10.1109/ICTSD.2015.7095911 (hereinafter Jadhav). (Year: 2015).*

*Primary Examiner* — Michael P Harrington
(74) *Attorney, Agent, or Firm* — Brian Hausman

(57) ABSTRACT

An electronic toll data collection management system comprises a plurality of nodes, wherein at least one of the plurality of nodes is a toll collection point, wherein the toll collection point comprises: a computing system; and a receiver; wherein each of the plurality of nodes has access to a copy of a distributed ledger, wherein the processor of each of the plurality of nodes is configured to: utilize blockchain protocols to verify and record a transaction occurring within the distributed ledger; parse through the blockchain to locate the block containing the transmitted data from the transmitter, de-encrypt the block, and extract the data; and encrypt a new block indicating a debit to an account of an operator of a vehicle, wherein the account is identifiable through the transmitted data from the transmitter.

17 Claims, 3 Drawing Sheets

Related U.S. Application Data continuation of application No. 15/836,846, filed on Dec. 9, 2017, now Pat. No. 10,699,493.

(51) Int. Cl.
 *H04L 9/32* (2006.01)
 *H04L 9/00* (2022.01)

(52) U.S. Cl.
 CPC .......... *H04L 9/3239* (2013.01); *H04L 9/3247* (2013.01); *H04L 9/50* (2022.05)

(58) Field of Classification Search
 CPC .... G06Q 30/0284; G06Q 50/43; G06Q 50/40; H04L 9/06; H04L 9/0637

See application file for complete search history.

(56) References Cited

U.S. PATENT DOCUMENTS

| | | |
|---|---|---|
| 9,361,492 B2 | 6/2016 | Gravelle et al. |
| 9,608,829 B2 | 3/2017 | Spanos et al. |
| 9,633,238 B2 | 4/2017 | Gravelle et al. |
| 2006/0184456 A1* | 8/2006 | de Janasz ............ G06Q 20/403 705/72 |
| 2008/0120172 A1 | 5/2008 | Robinson et al. |
| 2008/0147491 A1* | 6/2008 | Robinson ............... G07B 15/00 705/13 |
| 2015/0332283 A1 | 11/2015 | Witchey |
| 2016/0027229 A1 | 1/2016 | Spanos et al. |
| 2016/0260169 A1 | 9/2016 | Arnold et al. |
| 2016/0292672 A1 | 10/2016 | Fay et al. |
| 2017/0048216 A1 | 2/2017 | Chow et al. |
| 2017/0103468 A1 | 4/2017 | Orsini et al. |
| 2017/0177898 A1 | 6/2017 | Dillenberger |
| 2017/0212781 A1 | 7/2017 | Dillenberger et al. |
| 2018/0018723 A1* | 1/2018 | Nagla ................... H04L 63/102 |
| 2018/0061143 A1* | 3/2018 | Nelson ................... G06Q 20/10 |

* cited by examiner

SYSTEM AND METHOD FOR TOLL TRANSACTIONS UTILIZING A DISTRIBUTED LEDGER

BACKGROUND OF THE INVENTION

Toll roads may facilitate the passage of a large volume of vehicles every day. Traditionally, there is a toll collection point along a given toll road wherein an operator of a vehicle must pay a toll (i.e., a variable fee) for passage along the road. To reduce time spent at a toll collection point and to increase efficiency, these toll collection points have increasingly become unmanned stations that rely on electronic toll collection systems.

Electronic toll collection systems have become increasingly popular since participation in the system allows an operator to bypass cash-only toll collection points that usually take more time to pass through. An operator of a vehicle may choose to create an account with a company managing an electronic toll collection system. Upon creating an account, the operator may receive a transmitter to be placed in the vehicle, Typically, as a vehicle gets close to a toll collection point, the transmitter transmits information to a receiver. A camera may verify the information being transmitted by capturing a picture of the vehicle, Both the transmitted information and the captured image may be sent to an information handling system. There may be a central information handling system dedicated to transaction processing. Electronic toll collection systems may operate on four main components: automated vehicle identification, automated vehicle classification, transaction processing, and violation enforcement. Often, companies contract out each of these components to handle separately. Independent companies may not have access to the overarching company's database that manages the electronic toll system, or other independent companies' databases.

Thus, there is a need for a system that utilizes a distributed ledger that may access, process, and manipulate the data acquired at a toll collection point.

BRIEF DESCRIPTION OF THE DRAWINGS

For a detailed description of the preferred examples of the invention, reference will now be made to the accompanying drawings in which.

DETAILED DESCRIPTION OF THE PREFERRED EXAMPLES

The present disclosure relates to implementing an electronic toll data collection management system in a decentralized computing network that employs a distributed ledger. More particularly, examples of a system and method are disclosed for processing vehicle and financial information as an operator passes through a toll collection point. The decentralized computing network may include a plurality of computing systems that act as nodes. Each node may access the distributed ledger. In examples, the distributed ledger may utilize blockchain technology and protocols.

Figure 1:
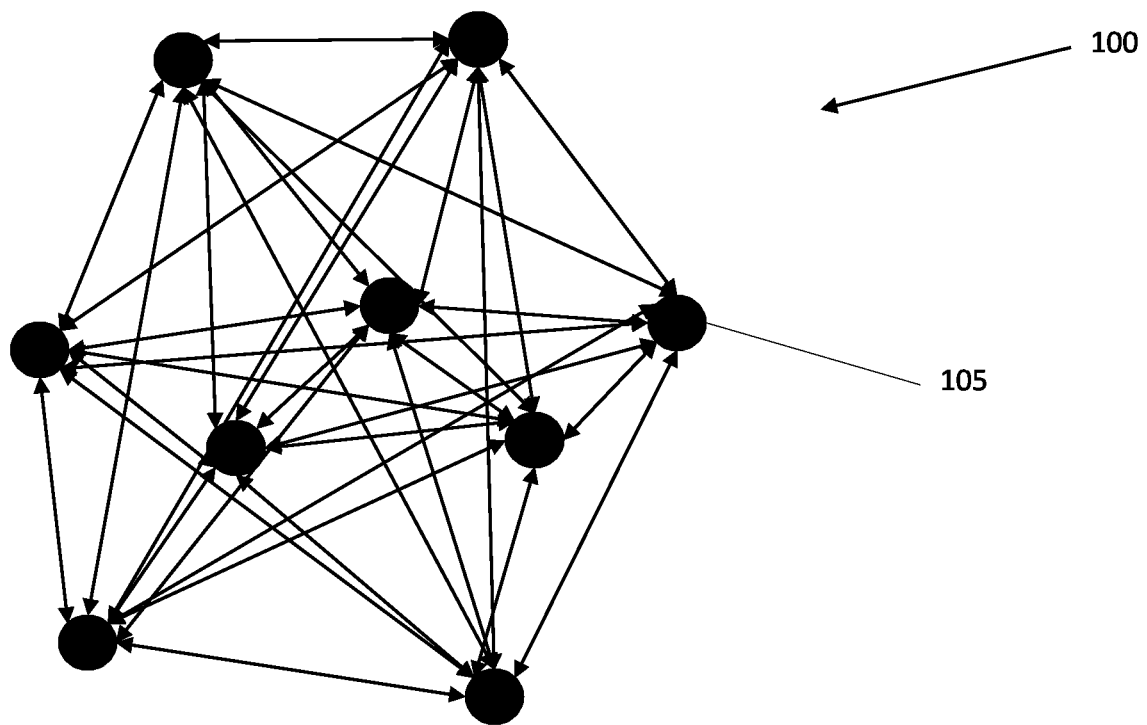
FIG. 1 illustrates an example of a decentralized computing network.

FIG. 1 illustrates an example of a decentralized computing network 100. Decentralized computing network 100 may include a plurality of nodes 105. Node 105 may be operated by an individual, company, and/or other entity. Each node 105 may include a processor, a memory unit, and a bus. The memory unit may be volatile and/or non-volatile. Further hardware and/or software may be used by each node 105. Additionally, any suitable input and output (I/O) devices may be implemented. Without limitation, node 105 may be a computer. Concerning the present disclosure, computer-readable storage mediums may be utilized.

Decentralized computing network 100 may connect the plurality of nodes 105 by any form or medium of digital data communication such as a communication network. Without limitation, a communication network may include a local area network ("LAN"), a metropolitan area network ("MAN"), a wide area network ("WAN"), peer-to-peer networks (structured, unstructured, and/or hybrid models), grid computing infrastructures, the Internet, and/or combinations thereof.

In examples, decentralized computing network 100 may utilize blockchain technology and protocols for the distributed ledger. However, not all distributed ledgers may necessarily employ blockchain technology to successfully provide secure and valid achievement of distributed consensus. Without limitation, a blockchain may be one type of data structure considered to be a distributed ledger. A blockchain may be a continuously growing list of records. In examples, the records may be represented as blocks. Each block may include transaction data, a hash pointer, a timestamp, and/or combinations thereof. These blocks may be linked and secured using cryptographic measures. Cryptographic measures may include any suitable mathematical algorithm In examples, a hash function may be used as the cryptographic measure, wherein the hash function is a mathematical algorithm that takes a data input and generates a fixed output (e.g., a bit string with a fixed length). Hash functions may have pre-image resistance, wherein it may be infeasible to invert without using a brute-force method of trying to compare hashed values of random inputs. Hash functions may be collision resistant, wherein it may be infeasible for two given inputs to produce the same output. In examples, a hash function may be designed to be a one-way function.

The methodology behind blockchain may promote a decentralized network over a peer-to-peer network rather than a central computing system. In examples, the plurality of nodes 105 may own a full copy of the distributed ledger. When a transaction occurs in the distributed ledger, the plurality of nodes 105 may verify the status of the distributed ledger (i.e., the addition of a new block). A consensus among the plurality of nodes 105 may be required to verify the status of the distributed ledger. Any suitable protocol may be used to reach consensus. Without limitation, suitable protocols may be proof of work, proof of stake, proof of authority, and/or combinations thereof. In examples, this may occur automatically and/or continuously. Once consensus has been reached, the distributed ledger may be updated (i.e., the addition of a block).

In examples, digital signatures may be used in the blockchain. In examples, a public and private key may be created using an algorithm and may be related to each other. The public key may be distributed to the plurality of nodes 105. The private key may be kept by an individual node 105 to digitally sign any transaction occurring in the distributed ledger. The receiving party of a transaction that has been signed may verify the data within the transaction by using the public key. One of ordinary skill in the art would recognize that any known digital signature systems may be used without departing from the spirit and scope of the present invention.

Figure 2:
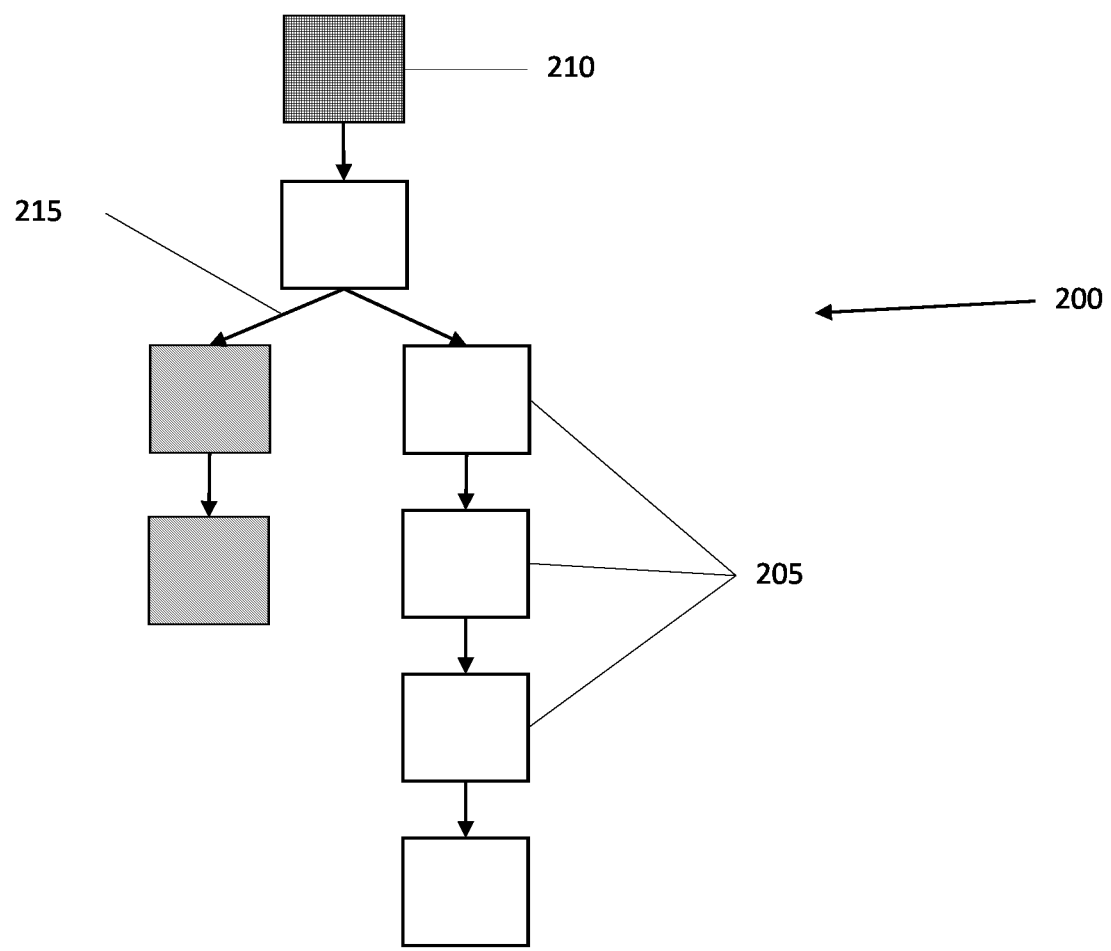
FIG. 2 illustrates an example of a blockchain.

FIG. 2 illustrates an example of a blockchain 200. There may be a plurality of blocks 205 within blockchain 200. In examples, a first block 210 may represent the first data transactions within the distributed ledger. The first block 210 may include any suitable size of data. A hash function may be used to generate an output value (e.g., a "hash") from the first data transactions. For each subsequent block 205 added to blockchain 200, the input to the hash function of the new block may include the previous block's hash and the data transactions represented by the new block. This may produce a system wherein the plurality of blocks 205 are linked, in sequential order, by the previous block's output value of the hash function. The linked blocks 205 may allow the plurality of nodes 105 (referring to FIG. 1) to follow blockchain 200 backwards, from progression, in order to observe and verify data transactions. In examples, any suitable data mining technique may be used to verify and/or create the addition of a block in blockchain 200.

In examples, a fork 215 may be created within blockchain 200. This may be when blockchain 200 diverges into two potential paths of progression. Without limitation, fork 215 may be introduced when two blocks 205 are added that claim the hash of the previous block, when an invalid transaction occurs, and/or when new protocols are implemented. In the example wherein fork 215 is introduced due to two blocks being added, a portion of the plurality of nodes 105 (referring to FIG. 1) may allocate computational efforts in adding blocks onto one side of fork 215. The remaining portion of the plurality of nodes 105 may allocate computational efforts in adding blocks onto the other side of fork 215. One side of fork 215 will inevitably surpass the other in length. The plurality of nodes may come to an agreement that the longer side of fork 215 is the legitimate path of progression of blockchain 200. In examples, the path of progression on the other side of fork 215 may be deemed invalid, may be abandoned, and/or data transactions within the blocks may be lost. In examples with accordance to this disclosure, blockchain 200 may be able to accommodate forks.

In examples, the distributed ledger may be private, public, and/or combinations thereof. The electronic toll data collection management system may have access to information that an operator of a vehicle may not want publicly disclosed (i.e., vehicle information, information on a driver's license, financial information, etc.). There may be different types of nodes 105 (referring to FIG. 1) in the electronic toll data collection management system. There may be limited access within the distributed ledger based on the type of node 105 in operation. Without limitation, different types of nodes 105 that may interact within the electronic toll data collection management system may be the company regulating the toll road, other companies, the general public, the government, and/or combinations thereof. In examples, the distributed ledger may be shared and/or compatible with distributed ledgers and/or databases belonging to other entities. This may allow cross-referencing between entities.

In examples, smart contracts may be used within the distributed ledger. Smart contracts may be computer protocols to execute the agreed upon terms of a contract. Smart contracts may be partially and/or fully self-executing. In examples, smart contracts may be written as code in blockchain 200. Transactions within a smart contract may be reflected in blockchain 200 as the plurality of nodes 105 (referring to FIG. 1) receive the data transactions, verify the information, and update their respective copies of the distributed ledger.

Figure 3:
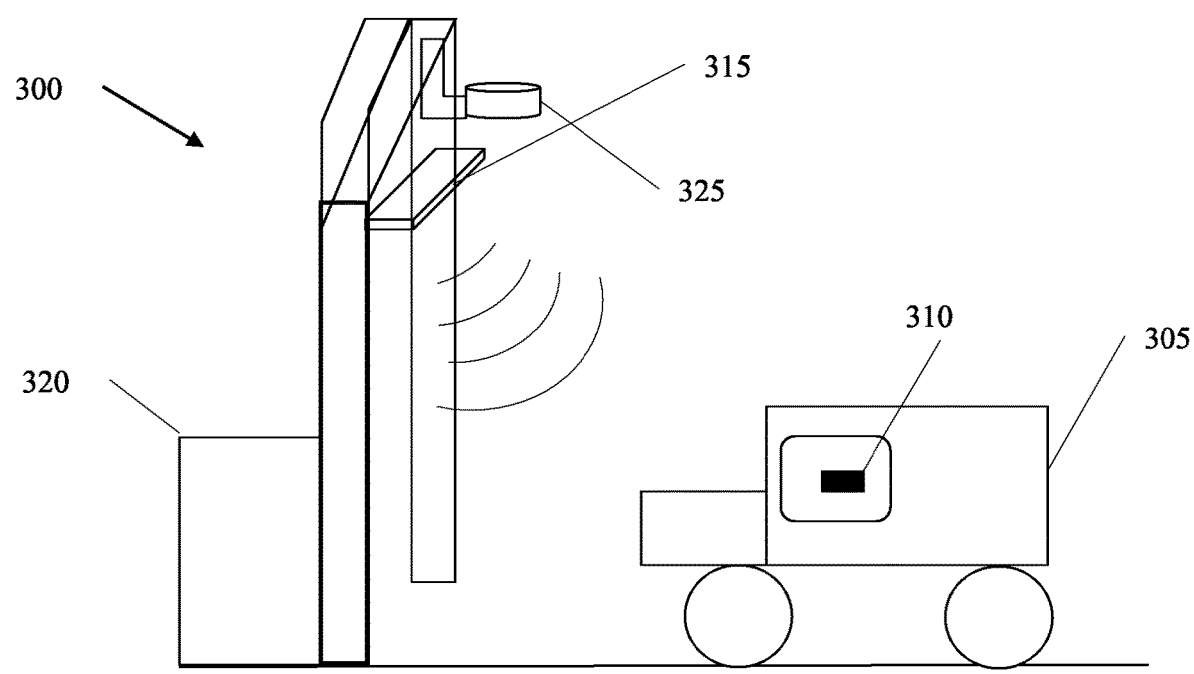
FIG. 3 illustrates an example of a toll collection point.

FIG. 3 illustrates an example of a toll collection point 300. Toll collection point 300 may serve to collect a fee to be paid in order to continue travelling along a path (i.e., a toll road). In examples, an operator of a vehicle 305 may have created an account with a company regulating the toll road. A new block 205 may be added to blockchain 200 (referring to FIG. 2) that reflects the creation of an account between the operator and the company. The account may contain information provided by the operator. Without limitation, the information provided may include vehicle make and model, vehicle registration number, year of vehicle manufacture, license plate number, driver's license number, operator contact information, billing information for the operator, operator permanent address, and/or combinations thereof. Traditionally, this information may be stored in a database at a central computing center. In examples within the present disclosure, this information may be contained in the new block 205, or a subsequent block 205. In examples, the creation of the account may have been done through a smart contract between the operator and the company, wherein the smart contract is recorded in blockchain 200 (referring to FIG. 2). Agreed upon terms may include initially depositing a certain amount of money into the account and debiting the account a certain fee every time the operator passes through toll collection point 300 along a toll road. Further agreed upon terms may include breach-of-contract payments and/or processes. In examples, the smart contract may partially self-execute until the terms have been fulfilled. In exchange for creating an account, the company may provide the operator with a transmitter 310.

Transmitter 310 may be any suitable device capable of producing electromagnetic waves. Transmitter 310 may include and utilize any suitable hardware and/or software to produce electromagnetic waves. The electromagnetic waves may travel at a specified frequency. Transmitter 310 may be any suitable size, height, and/or shape. In examples, transmitter 310 may be in the shape of a card. Transmitter 310 may be placed anywhere within or on vehicle 305. Without limitation, transmitter 310 may use radio-frequency identification (RFID). Transmitter 310 may passively or actively operate. In examples, transmitter 310 may operate to produce an electromagnetic wave after receiving enough energy emitted from a receiver in a certain proximity. In alternative examples, transmitter 310 may include a power source for active operation. Any suitable power source may be used to induce operation of transmitter 310.

As vehicle 305 passes by and/or through toll collection point 300, transmitter 310 may transmit data via electromagnetic waves to a receiver 315. In examples, the transmitted data may be a serial number for the operator's account. In alternative examples, the transmitted data may contain information within the operator's account. There may be a plurality of receivers 315. Receiver 315 may be any suitable size, height, and/or shape. Receiver 315 may process the incoming electromagnetic waves and convert them into electrical currents. Receiver 315 may include and utilize any suitable hardware and/or software to receive and process electromagnetic waves. The electrical currents containing the data transmitted by the electromagnetic waves may travel into a computing system 320.

Computing system 320 may include similar components as node 105 (referring to FIG. 1). Computing system 320 may include a processor, a memory unit, and a bus. The memory unit may be volatile and/or non-volatile. Further hardware and/or software may be used by computing system 320. Additionally, any suitable input and output (I/O) devices may be implemented. Without limitation, computing system 320 may be a computer. Concerning the present disclosure, computer-readable storage mediums may be utilized.

In examples, computing system 320 may act as node 105 (referring to FIG. 1) in the disclosed electronic toll data collection management system. Computing system 320 may broadcast the data received as electrical currents to the distributed ledger. In examples, the plurality of nodes 105 (referring to FIG. 1) may verify and update their respective copies of the distributed ledger, within the electronic toll data collection management system, that the operator of vehicle 305 has passed by and/or through toll collection point 300 at a certain time. The smart contract in place within blockchain 200 (referring to FIG. 2) may partially self-execute when this data is processed. In examples, this self-execution may debit the operator's account a specified amount for the toll fee. The plurality of nodes 105 (referring to FIG. 1) may further verify and update their respective copies of the distributed ledger that the operator's account has been debited by the company regulating the toll road. Concerning the present disclosure, the implementation of the electronic toll data collection management system may negate the need for central databases to store and update a regulating company's customer data.

Toll collection point 300 may further include a camera 325. Camera 325 may take a picture of vehicle 305 as it passes through toll collection point 300. Camera 325 may be any suitable device or sensor, or collection of hardware and/or software, for capturing an image as vehicle 305 passes by. Camera 325 may implement laser scanners. In examples, this picture may be used to verify the information transmitted by transmitter 310. The picture may be sent to computing system 320 to be broadcast to the plurality of nodes 105 (referring to FIG. 1) within the electronic toll data collection management system. The plurality of nodes 105 may verify this transaction and update their respective copies of the distributed ledger.

In examples, an operator may create an account with the regulating company of a toll road but may not receive a transmitter. In this particular example, camera 325 may take a picture of vehicle 305 as it passes through toll collection point 300. The picture may be sent to computing system 320 to be broadcast to the plurality of nodes 105 (referring to FIG. 1) within the electronic toll data collection management system. The plurality of nodes 105 may verify this transaction and update their respective copies of the distributed ledger. In examples, the electronic toll data collection management system may employ automated vehicle identification protocols. The picture taken may be analyzed to extract the license plate number of vehicle 305. A legible license plate number may be extracted from the picture, depending on the quality of the picture. In other examples, a license plate number may not be extracted as outside factors may produce a poor image of vehicle 305 (i.e., inclement weather). A request may be broadcast over the distributed ledger to find the account containing the extracted license plate number. Blockchain 200 (referring to FIG. 2) may be parsed through to find the matching account. The matching account may be debited a specified amount for the toll fee. The plurality of nodes 105 (referring to FIG. 1) may further verify and update their respective copies of the distributed ledger that the matching account has been debited by the company regulating the toll road.

In examples, an operator of vehicle 305 may not have created an account with the company regulating the toll road. Subsequently, the operator may not have obtained a transmitter 310 to transmit data to the electronic toll data collection management system. As the operator passes through toll collection point 300, no data may be transmitted to receiver 315. In examples, camera 325 may take a picture of vehicle 305 as it passes through toll collection point 300. In examples, a "pay-by-mail" system may be used by the regulating company which may run based off a similar concept. The picture may be sent to computing system 320. Computing system 320 may flag the picture of vehicle 305 as belonging to an operator who has not opened an account with the company regulating the toll road and/or who has not payed the toll. The flagged picture may be broadcast to the plurality of nodes 105 (referring to FIG. 1). The plurality of nodes 105 may verify this transaction and update their respective copies of the distributed ledger.

In examples, the operator of a vehicle within a flagged picture still owes the company regulating the toll road a fee for travelling on it. The regulating company may contract out the function of acquiring payments from operators who do not pay the fee to other companies (i.e., collection agencies). In examples, operators who refuse to pay the fee or do not pay within a specified time may be prosecuted. In this particular example, the government and/or law enforcement may become involved. Concerning the present disclosure, the distributed ledger may provide an indisputable record for any party involved in a dispute (i.e., questioning whether or not the operator had passed through a toll collection point 300).

It may be difficult for companies to find information on the operator of the vehicle based on a picture taken of that vehicle. It may take days and/or weeks to process the image, extract useable information, search public databases to find contact information for the operator, and bill the operator. Concerning the present disclosure, the electronic toll data collection management system may reduce time and costs and increase efficiency.

In examples, the electronic toll data collection management system may be accessible to a plurality of nodes 105 (as discussed above). A first node 105 acting on behalf of the regulating company may search through blockchain 200 (referring to FIG. 2) to find information concerning operators who have not paid back the regulating company for accessing the toll road. In examples, first node 105 may act on behalf of another party. In examples, this information may be a flagged picture. First node 105 may de-encrypt the block 205 containing that information. First node 105 may extract that information. First node 105 may enter into a smart contract with a second node 105. In examples, second node 105 may act on behalf of a government agency. First node 105 may request that second node 105 use the extracted information to match it with other information. In examples, first node 105 may request second node 105 to acquire a specific operator's contact information and permanent address. Without limitation, other information may be requested if required by the regulating company. Second node 105 may run the extracted information through an external database. In examples, the external database may contain data matching that of the extracted information. The matching data may provide additional information that the first node 105 had requested. Second node 105 may broadcast this additional information to blockchain 200. The plurality of nodes 105 may verify this transaction and update their respective copies of the distributed ledger. First node 105 may now be able to contact an operator of a vehicle within a flagged picture by utilizing this new data.

In examples, first node 105 may enter into a smart contract with second node 105 prior to extracting information from a block. The agreed upon terms may allow second node 105 to parse through blockchain 200 (referring to FIG. 2) to gather the information to be run in an external database. Second node 105 may be granted access to de-encrypt the relevant block 205. Second node 105 may extract the information to be run in the external database. In examples, second node 105 may fulfill the terms of the smart contract as previously discussed.

In examples, an operator of vehicle 305 may not need to create an account with the company regulating the toll road. There may be a barrier (not illustrated) blocking a road lane. The barrier may not permit the operator of vehicle 305 from passing through unless physical currency is deposited at toll collection point 300. In examples, as the operator deposits physical currency at toll collection point 300, computing system 320 may record this transaction. Computing system 320 may move the barrier blocking the road lane so as to allow the operator of vehicle 305 to pass through. Computing system 320 may broadcast the deposit of physical currency and/or the raising of the barrier to the plurality of nodes 105 (referring to FIG. 1) within the electronic toll data collection management system. The plurality of nodes 105 may verify this transaction and update their respective copies of the distributed ledger.

In examples, the distributed ledger may be categorized by type of input data. In alternative examples, the distributed ledger may be a single blockchain 200 (referring to FIG. 2) that includes all data. Separate blockchains 200 (referring to FIG. 2) may be created to represent data within specific categories. Without limitation, some of these categories may be an operator's financial information, the transmitted data received from transmitter 310, vehicle information, and/or combinations thereof. In examples, some blockchains 200 may only be accessed by the government and/or law enforcement agencies. In examples, a separate blockchain (referring to FIG. 2) may be utilized specifically for maintaining records on operators of vehicles 305 who have not paid tolls as they pass through toll collection points 300. In examples, a separate blockchain 200 (referring to FIG. 2) may be utilized to utilize data provided by law enforcement agencies and/or the government. Nodes 105 (referring to FIG. 1) operating under law enforcement agencies and/or the government may be granted access within a smart contract to use data related to violators who do not pay the toll and/or may be able to input data from their own databases into the blockchain 200. In examples, the regulating company may interact with law enforcement and/or the government through the distributed ledger.

As previously discussed, first node 105 and second node 105 may enter into a smart contract to acquire missing information and/or to match data together. In previous examples, first node 105 may extract specific data from blockchain 200 (referring to FIG. 2) and provide that data to second node 105. Second node 105 may then search external databases for matching data and upload the matched data to blockchain 200 (referring to FIG. 2) so first node 105 may have access. In other previous examples, second node 105 may extract specific data from blockchain 200 (referring to FIG. 2), search external databases for a match, and upload matched data to blockchain 200 (referring to FIG. 2). In alternative examples, first node may parse through a first blockchain 200, de-encrypt the appropriate block 205 (referring to FIG. 2), extract the relevant data, and provide that data to second node 105. Second node 105 may then parse through a second blockchain 200 to find matching data, de-encrypt the appropriate block 205 (referring to FIG. 2), extract the matching data and/or any relevant information, and provide that data to first node 105. In alternative examples, second node 105 may parse through the first blockchain 200 that contains the data to be utilized and may parse through the second blockchain 200 to find matching data. Second node 105 may locate the appropriate block 205 (referring to FIG. 2), de-encrypt it, extract the relevant data, and provide it to first node 105. First node 105 may transfer that data to a separate blockchain 200. First node 105 and/or second node 105 may broadcast the matched data to a separate blockchain 200. The plurality of nodes 105 (referring to FIG. 1) may verify this transaction and update their respective copies of the distributed ledger.

Although the present invention and its advantages have been described in detail, it should be understood that various changes, substitutions and alterations may be made herein without departing from the spirit and scope of the invention as defined by the appended claims.

What is claimed is:

1. A toll collection point, comprising:
   a receiver, wherein the receiver is configured to receive data from a transmitter; and
   a computing system operably coupled to the receiver, wherein the computing system comprises a processor operable to:
   receive the data transmitted to the receiver from the transmitter;
   determine an account associated with an operator of a vehicle, wherein the account is determined, in part, by:
      parsing through a blockchain in a copy of a distributed ledger to locate transaction data corresponding to the received data from the transmitter, wherein the computing system is configured to utilize blockchain protocols to verify and record one or more transactions occurring within the distributed ledger; and
      de-encrypting the transaction data to compare to the received data;
   wherein the account is further determined, in part, by:
      parsing through the blockchain to locate an image associated with the vehicle and extracting data from the located image; and
      performing automated vehicle identification protocols on the extracted data to determine a license plate number of the vehicle in the image;
   update the copy of the distributed ledger by encrypting an indication of a debit to the determined account of the operator of the vehicle; and
   transmit a broadcast indicating the updated copy of the distributed ledger to a plurality of nodes communicatively coupled to the computing system.

2. The toll collection point of claim 1, further comprising a camera operably coupled to the computing system, wherein the camera is configured to capture an image of the vehicle as it passes through the toll collection point.

3. The toll collection point of claim 2, wherein the processor of the computing system is further operable to:
   receive the image captured by the camera; and
   broadcast the image as data to the plurality of nodes.

4. The toll collection point of claim 1, wherein the transmitted data is vehicle make and model, vehicle registration number, year of vehicle manufacture, license plate number, driver's license number, operator contact information, billing information for the operator, operator permanent address, or a combination thereof.

5. The toll collection point of claim 1, wherein the processor of the computing system is further operable to:
provide access of the determined account by transmitting a signal to one or more nodes, wherein the processor is configured to enter into a smart contract with the one or more nodes to provide access of the determined account to the one or more nodes.

6. The toll collection point of claim 5, wherein the processor of the computing system is further operable to:
receive matching data determined by the one or more nodes, wherein the one or more nodes search an external database to determine the matching data.

7. The toll collection point of claim 1, wherein the processor of the computing system is further operable to:
receive an image captured by a camera, wherein the camera is configured to capture the image of the vehicle as it passes through the toll collection point; and
perform automated vehicle identification protocols on the image to determine a license plate number of the vehicle in the image.

8. The toll collection point of claim 7, wherein the processor of the computing system is further operable to:
identify an account of an operator corresponding to the determined license plate number from the image; and
in response to the vehicle passing through the toll collection point without a transmitter, apply a debit to the account.

9. A non-transitory computer-readable medium comprising instructions that are configured, when executed by a processor, to:
receive data from a transmitter via a receiver;
determine an account associated with an operator of a vehicle, wherein the account is determined, in part, by:
parsing through a blockchain in a copy of a distributed ledger to locate transaction data corresponding to the received data from the transmitter, wherein parsing through the blockchain comprises utilizing blockchain protocols to verify and record one or more transactions occurring within the distributed ledger; and
de-encrypting the transaction data to compare to the received data;
wherein the account is further determined, in part, by:
parsing through the blockchain to locate an image associated with the vehicle and extracting data from the located image; and
performing automated vehicle identification protocols on the extracted data to determine a license plate number of the vehicle in the image;
update the copy of the distributed ledger by encrypting an indication of a debit to the determined account of the operator of the vehicle; and
transmit a broadcast indicating the updated copy of the distributed ledger to a plurality of nodes.

10. The non-transitory computer-readable medium of claim 9, wherein the instructions are further configured to:
receive an image captured by a camera; and
broadcast the image as data to the plurality of nodes.

11. The non-transitory computer-readable medium of claim 9, wherein the account is determined, in part, based on the license plate number of the vehicle.

12. The non-transitory computer-readable medium of claim 9, wherein the instructions are further configured to:
transmit an instruction to displace a barrier inhibiting the vehicle.

13. The non-transitory computer-readable medium of claim 9, wherein the instructions are further configured to:
provide access of the determined account by transmitting a signal to one or more nodes, wherein the processor is configured to enter into a smart contract with the one or more nodes to provide access of the determined account to the one or more nodes.

14. The non-transitory computer-readable medium of claim 13, wherein the instructions are further configured to:
receive matching data determined by the one or more nodes, wherein the one or more nodes search an external database to determine the matching data.

15. The non-transitory computer-readable medium of claim 9, wherein the instructions are further configured to:
receive an image captured by a camera, wherein the camera is configured to capture the image of the vehicle as it passes through the toll collection point; and
perform automated vehicle identification protocols on the image to determine a license plate number of the vehicle in the image.

16. A method of identifying an operator of a vehicle, comprising:
receiving data from a transmitter via a receiver disposed at a toll collection point;
determining an account associated with an operator of a vehicle, wherein the account is determined, in part, by:
parsing through a blockchain in a copy of a distributed ledger to locate transaction data corresponding to the received data from the transmitter, wherein parsing through the blockchain comprises utilizing blockchain protocols to verify and record one or more transactions occurring within the distributed ledger; and
de-encrypting the transaction data to compare to the received data;
wherein the account is further determined, in part, by:
parsing through the blockchain to locate an image associated with the vehicle and extracting data from the located image; and
performing automated vehicle identification protocols on the extracted data to determine a license plate number of the vehicle in the image;
updating the copy of the distributed ledger by encrypting an indication of a debit to the determined account of the operator of the vehicle; and
transmitting a broadcast indicating the updated copy of the distributed ledger to a plurality of nodes.

17. The method of claim 16, further comprising:
receiving an image captured by a camera, wherein the camera is configured to capture the image of the vehicle as it passes through the toll collection point; and
performing automated vehicle identification protocols on the image to determine a license plate number of the vehicle in the image.

* * * * *